United States Patent
Emrich et al.

(10) Patent No.: US 7,143,824 B2
(45) Date of Patent: Dec. 5, 2006

(54) HEAT EXCHANGER, IN PARTICULAR CHARGE-AIR COOLER

(75) Inventors: Karsten Emrich, Stuttgart (DE); Daniel Hendrix, Stuttgart (DE); Wolfgang Reeb, Aichtal (DE); Andre Schairer, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 39 days.

(21) Appl. No.: 10/512,415

(22) PCT Filed: Apr. 22, 2003

(86) PCT No.: PCT/EP03/04163

§ 371 (c)(1),
(2), (4) Date: Oct. 25, 2004

(87) PCT Pub. No.: WO03/093751

PCT Pub. Date: Nov. 13, 2003

(65) Prior Publication Data
US 2005/0161194 A1   Jul. 28, 2005

(30) Foreign Application Priority Data
May 3, 2002   (DE)  ................................ 102 19 867

(51) Int. Cl.
F28F 9/04   (2006.01)

(52) U.S. Cl. ........................................ 165/178; 165/76
(58) Field of Classification Search ................ 165/173, 165/178, 76
See application file for complete search history.

(56) References Cited

U.S. PATENT DOCUMENTS

| | | | | |
|---|---|---|---|---|
| 2,143,477 A | * | 1/1939 | Dillon et al. | 165/178 |
| 2,195,403 A | * | 4/1940 | Bay | 165/178 |
| 2,209,974 A | * | 8/1940 | Jacobus | 165/76 |
| 2,620,830 A | * | 12/1952 | Schultz | 165/178 |
| 2,966,373 A | * | 12/1960 | Yount | 165/178 |
| 3,077,661 A | | 2/1963 | Fromson | |
| 3,317,222 A | * | 5/1967 | Maretzo | 165/178 |
| 5,101,887 A | * | 4/1992 | Kado | 165/76 |
| 5,647,432 A | * | 7/1997 | Rexford et al. | 165/178 |

FOREIGN PATENT DOCUMENTS

| | | |
|---|---|---|
| DE | 297 05 214 U1 | 5/1997 |
| DE | 196 08 049 A1 | 9/1997 |
| DE | 197 57 034 A1 | 6/1999 |
| EP | 0 773 420 A2 | 5/1997 |
| FR | 608.433 | 7/1926 |
| GB | 622421 | 5/1949 |
| JP | 10-9791 A | 1/1998 |

* cited by examiner

Primary Examiner—Teresa J. Walberg
(74) Attorney, Agent, or Firm—Foley & Lardner LLP

(57) ABSTRACT

The invention relates to a heat exchanger, in particular a charge-air cooler for a motor vehicle.

15 Claims, 3 Drawing Sheets

HEAT EXCHANGER, IN PARTICULAR CHARGE-AIR COOLER

BACKGROUND OF THE INVENTION

The present invention relates to a heat exchanger, in particular a charge air cooler for a motor vehicle.

In order to achieve an increase in the power of an internal combustion engine, the air to be supplied for combustion can be compressed, for example, by means of a turbocharger before it is supplied to the combustion chambers of the internal combustion engine. At the same time, however, the compression of the air entails a heating of the latter which is a disadvantage for an optimum flow of the combustion process. For example, premature ignition or increased nitrogen oxide emission may be triggered as a result. In order to avoid the adverse consequences of overheated air supplied for combustion, a turbocharger is followed by a heat exchanger which is designed as a charge air cooler and by means of which the compressed air can be cooled to a permissible temperature before its combustion.

A charge air cooler is described, for example, in DE 197 57 034 A1. In the heat exchanger there, the hot air is introduced into a first collecting duct of the heat exchanger, where it is distributed and flows into flat tubes which issue into the collecting duct. The flat tubes are arranged next to one another, and with the side faces containing the long sides of their cross section being parallel to one another, and form a flow path by means of which cooling air is conducted through. The flow path has arranged in it, between the flat tubes, cooling ribs which bring about an effective heat exchange between the flat tubes and the cooling air stream. After crossing the cooling air stream, the flat tubes issue in a second collecting duct which supplies the cooled compressed charge air flowing into the latter for combustion in the engine.

In heat exchangers, such as, in particular, charge air coolers of this type, the tubes are conventionally inserted in orifices of a tube plate and soldered in a fluidtight manner. Whenever there is a charge of compressed air, this soldered joint undergoes high mechanical loads due to rapid pressure changes. Especially the narrow sides of flat tubes do not meet the mounting strength requirements, and therefore leaks may occur particularly at the corners of such tube plate connections.

A simpler way of increasing the strength of tube plate connections is to use tubes with a greater wall thickness or outer and/or inner ribs of greater material thickness. The increased mechanical stability is clear in both instances, but the extra outlay required for this purpose in terms of material costs and material weight is very high.

Other solution proposals are concerned with reducing the mechanical stress on the tube plate connections, for example by the use of tie rods in the charge air boxes. These tie rods stabilize the charge air boxes and thereby relieve the tube plate connections, but entail an increase in the pressure loss caused by the charge air cooler.

SUMMARY OF THE INVENTION

The object of the invention is to provide a heat exchanger, in which a high mechanical strength of tube plate connections can be implemented at a low extra outlay in terms of material and with a pressure loss which is not increased or is increased only slightly.

This object is achieved by means of a heat exchanger having the features of header tank with at least one chamber for distributing and/or collecting a flowing medium and of tubes which form at least one tube bundle.

A tube bundle within the meaning of the invention is formed by tubes, lying next to one another. The tubes may in this case be arranged in one row or in a plurality of rows.

The at least one box has a tube plate with orifices, the tubes being insertable into the orifices in order to be connected in a communicating manner to the at least one chamber. According to the invention, at least one tube which is insertable into an orifice of the tube plate has an at least double-walled construction at least in a region of the tube which is in the inserted state in the orifice. This makes it possible to have between the tube and the tube plate a firm soldered joint which also fulfills increased mechanical stability requirements. The extra outlay in terms of material and consequently of cost is particularly low, as compared with a single-walled tube, when the at least double-walled region of the tube is restricted to a region of the tube plate orifice or extends only a little beyond this region. Such restriction is possible with regard to strength, since the stability requirements to be met by the tube are normally lower outside the region of the tube plate orifice, so that a single-walled version of the tube is sufficient there.

A tube wall within the meaning of the invention is a three-dimensional structure which is delimited by an inner face or wall inner face to form an inside space of a tube and by an outer face or wall outer face to form an outside space or surroundings of the tube. A tube of double-walled construction therefore possesses two such walls, to be precise an inner and an outer wall, the outer face of the inner wall and the inner face of the outer wall being located opposite one another. In a double-walled region, an inner or an outer wall may have interruptions, that is to say it does not have to be continuously closed.

In order, in a preferred embodiment of a heat exchanger according to the invention, to increase further the stabilizing action of the at least double-walled version of a tube region, the outer face of an inner tube wall and the inner face of an outer tube wall touch one another. Especially preferably, the inner and the outer tube wall are soldered or welded to one another.

According to a preferred design of a heat exchanger according to the invention, an inner or an outer tube wall is formed by a shaped sheet metal strip. A sleeve obtained in this way can, in order to form an at least double-walled region without high outlay, be pushed into an existing at least single-walled tube or be slipped on to an at least single-walled tube when the shape of the sleeve is adapted to the shape of the at least single-walled tube. Both the manufacture and the mounting of such a sleeve are especially simple and therefore cost-effective to implement.

According to a further preferred design of a heat exchanger according to the invention, an inner or an outer tube wall is formed by an extruded molding. If the selected thickness of such a molding is variable along a circumference, an at least double-walled tube with a wall thickness sufficient for strength can be produced, while material can be saved at less sensitive points, which would not be the case in a tube with a constant wall thickness. Either an extruded sleeve or a sleeve shaped from a sheet metal strip can, in order to form an at least double-walled region, without high outlay, be pushed into an existing at least single-walled tube or be slipped on to the at least single-walled tube.

According to a preferred embodiment of a heat exchanger according to the invention, the at least double-walled tube is designed as a flat tube and/or as a polygonal tube. Especially in the case of a polygonal tube, for example, the shape of a push-in or slip-on sleeve can be adapted to the wall shape of the tube very simply and therefore cost-effectively by the corresponding folding of a sheet metal strip.

According to a preferred embodiment, the at least double-walled tube has at least one connecting web which connects mutually opposite regions of an inner wall to one another. Such a connecting web gives rise to a further reinforcement of the tube, thus leading, in the at least double-walled region, to a further increase in stability. As a result, if appropriate, the thickness of an inner or of an outer wall may be reduced, without a sufficient strength of the tube plate connection being dispensed with.

According to a preferred development, the at least one connecting web is constructed in one piece with the inner wall, in particular by the folding of a sheet metal strip to form a sleeve of corresponding shape. In this case, the at least one connecting web does not require any additional mounting step, as compared with an inner wall without a connecting web.

According to a preferred embodiment, an inner wall has a depression on its outside, such as a bead. Such a bead contributes, on the one hand, to a reinforcement of the inner wall and, on the other hand, to a greater accuracy of fit of the inner wall in an outer wall when the outer wall has an elevation, for example due to a weld seam.

In a preferred development of the invention, the depression is designed to run away in the outer face of the inner wall, that is to say a depth and/or width of the depression decreases in a longitudinal direction of the depression. If this runaway shape of the depression is brought about by the inner wall being pressed apart after insertion into an at least single-walled tube, the inner wall is jammed in the tube and is prevented from falling out, thereby increasing the manufacturing reliability.

According to a preferred refinement of a heat exchanger according to the invention, an outer wall of one tube is connected to at least one outer wall of an adjacent tube via at least one connecting element. Particularly with regard to flat tubes, the narrow sides of which require special stabilization, it is sufficient for the flat tubes to have an at least double-walled construction in the region of the narrow sides only. This is advantageously implemented by attaching an outer wall to an at least single-walled tube. If the outer walls of a plurality of tubes are connected to one another, these outer walls can be attached to the at least single-walled tubes in one work step, with the result that the assembly outlay and assembly costs are reduced.

An especially preferred development of the invention provides a one-piece construction of the outer walls of at least two tubes having at least one connecting element, in order to simplify manufacture even further. It is especially simple and therefore cost-effective to have an embodiment of the outer walls of at least two tubes with at least one connecting element as a shaped sheet metal strip which is very simply adapted in portions to the shape of at least single-walled tubes, after which the adapted portions of the sheet metal strip are attached to the at least single-walled tubes in order to form at least double-walled regions and, if appropriate, are soldered or welded to said tubes.

The invention is explained in more detail below by means of exemplary embodiments, with reference to the drawings in which:

BRIEF DESCRIPTION OF THE DRAWINGS

FIG. 1 illustrates a cross-sectional view of a preferred exemplary embodiment of an at least double-walled tube in a heat exchanger according to the invention. The square tube 5 consists of an outer wall 10 and of an inner wall 20, the inner face 30 of the outer wall 10 being soldered to the outer face 40 of the inner wall 20.

DETAILED DESCRIPTION OF PREFERRED EMBODIMENTS

Figure 1:
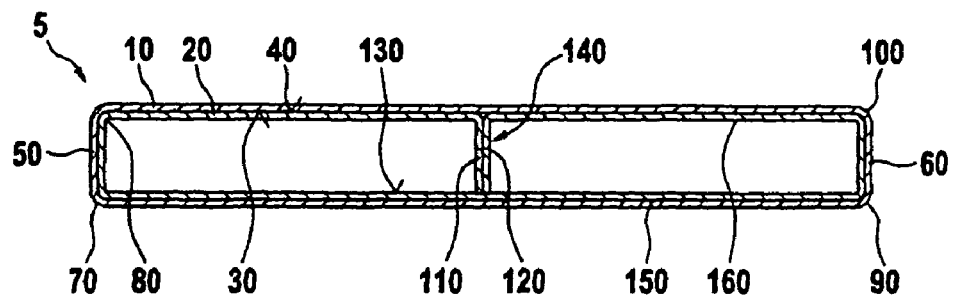
FIG. 1 shows a cross section of a tube of a heat exchanger according to the present invention.

Since, in a polygonal flat tube, such as a square tube 5, in a heat exchanger, such as, in particular, a charge air cooler, the highest mechanical loads occur in the region of the narrow sides 50 and 60, especially in the region of the edges 70, 80, 90 and 100, a soldered contact between the inner face 30 and the outer wall 10 and the outer face 40 of the inner wall 20 is especially advantageous there. The inner wall 20 is consequently folded out of a solder-plated sheet metal strip to form a sleeve which can be inserted into the outer wall 10 before a soldering operation, so that the inner face 30 of the outer wall 10 touches the outer face 40 of the inner wall 20 essentially along the entire tube circumference.

The end regions 110 and 120 of the sheet metal strip are shaped in such a way that they can be soldered to one another and to an opposite region of the inner face 130 of the inner wall 20, with the result that they jointly form a web 140 which connects the mutually opposite wide side 150 and 160 of the inner wall 20 to one another. The square tube 5 is thus additionally stabilized in the region of double-walled construction.

Figure 2:
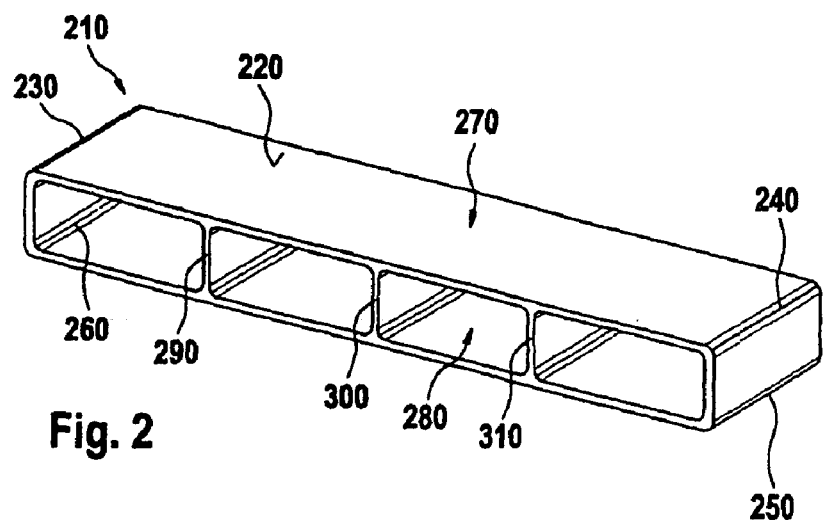
FIG. 2 shows a perspective view of an inner wall of a tube.

FIG. 2 shows a perspective view of an inner wall 210 which is constructed as an extruded sleeve and can be pushed into a single-walled tube, not illustrated, in order to form a double-walled region in a tube in a heat exchanger according to the invention. The outer face 220 of the inner wall 210 is adapted in its shape to an inner face of an outer wall, not shown in any more detail, the corner regions 230, 240, 250 and 260 of the inner wall 210 being reinforced, since they are exposed to particular mechanical loads when the heat exchanger is in operation. In regions subjected to less load, such as the wide sides 270 and 280, the inner wall 210 is of thinner construction, with the result that a saving of material is achieved. The wide sides 270 and 280 are connected to one another by means of webs 290, 300 and 310 in the interests of an increase in stability.

Figure 3:
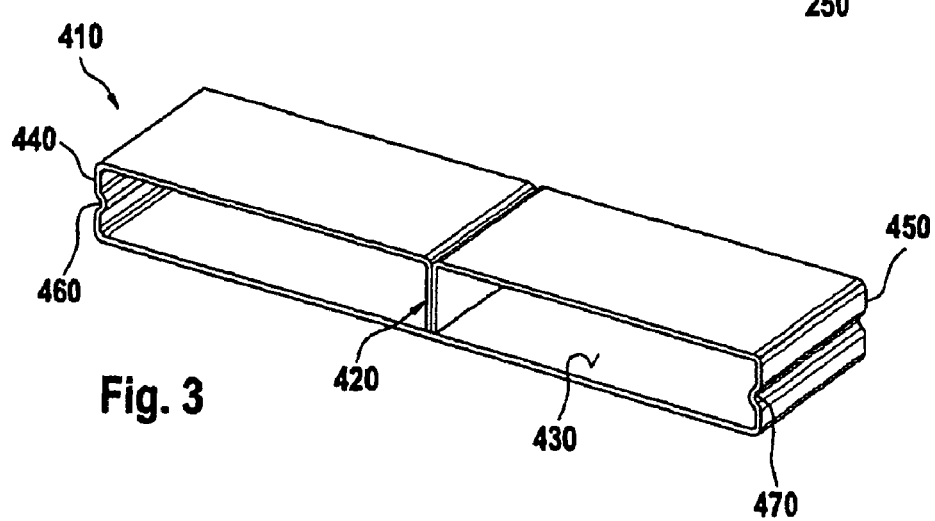
FIG. 3 shows a perspective view of an inner wall of a tube of a heat exchanger.

FIG. 3 shows a perspective illustration of a further preferred exemplary embodiment of an inner wall 410 of an at least double-walled tube in a heat exchanger according to the invention. Like the inner wall 20 of the exemplary embodiment in FIG. 1, the inner wall 410 is folded out of a solder-plated sheet metal strip to form a sleeve and has a stabilizing web 420.

In the narrow sides 440 and 450 of this sleeve are located beads 460 and 470 which, on the one hand, reinforce the inner wall 410 and consequently additionally stabilize the at least double-walled tube, not shown, and, on the other hand, prevent the sleeve from catching on elevations of the inner face of an outer wall, such as, for example, weld seams, when being pushed into the outer wall.

A particular advantage of this embodiment is afforded by the possibility of inserting the inner wall 410 into an at least single-walled tube with the aid of a ram, not illustrated, in order to form an at least double-walled region, the outer face of the ram possessing for the most part the shape of the inner face 430 of the inner wall 410. If the bead in the outer face of the ram runs away, that is to say becomes narrower and/or lower in its longitudinal direction, the beads 460 and 470 of the inner wall 410 are pressed outward during this operation, with the result that the narrow sides 440 and 450 are widened. Since the inner wall is then jammed in the outer wall and is prevented from falling out of the outer wall until a soldering operation, an increase in manufacturing reliability is achieved.

Figure 4:
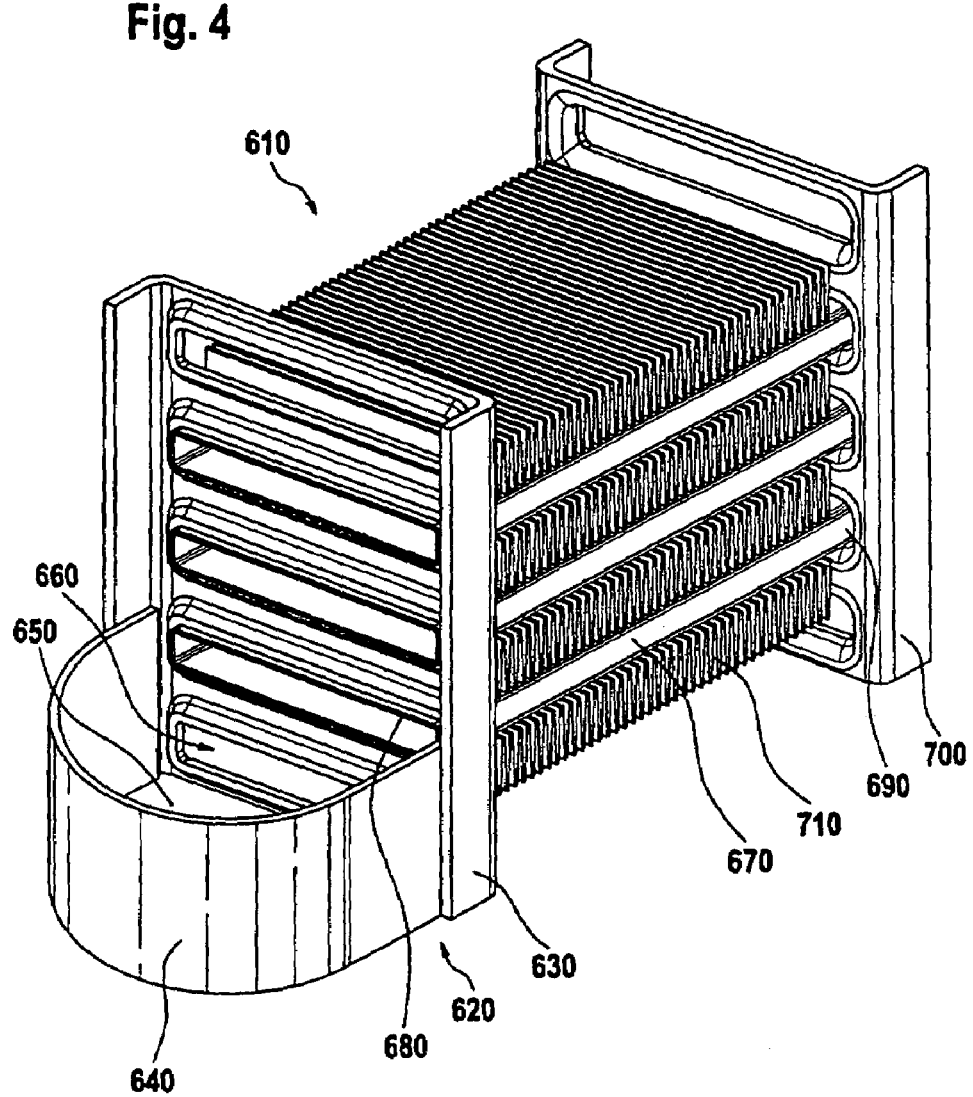
FIG. 4 shows a perspective part view of a cut away heat exchanger.

FIG. 4 illustrates a cut away perspective part view of a preferred exemplary embodiment of a heat exchanger according to the invention. The heat exchanger 610 has a box 620 which is formed by a tube plate 630 and a housing cover 640, a chamber 650 for distributing a first medium to be cooled, for example air, being located inside the box 620. Tubes 670 having a double-walled construction at their ends 680 are inserted through orifices 660 of the tube plate 630. The tubes 670 issue with their ends 690 located opposite the tube ends 680 into a box, indicated by a tube plate 700, for collecting the medium to be cooled. The cooling medium, for example likewise air, flows through the tube interspaces where corrugated ribs 710 are arranged in order to increase heat transmission.

Figure 5:
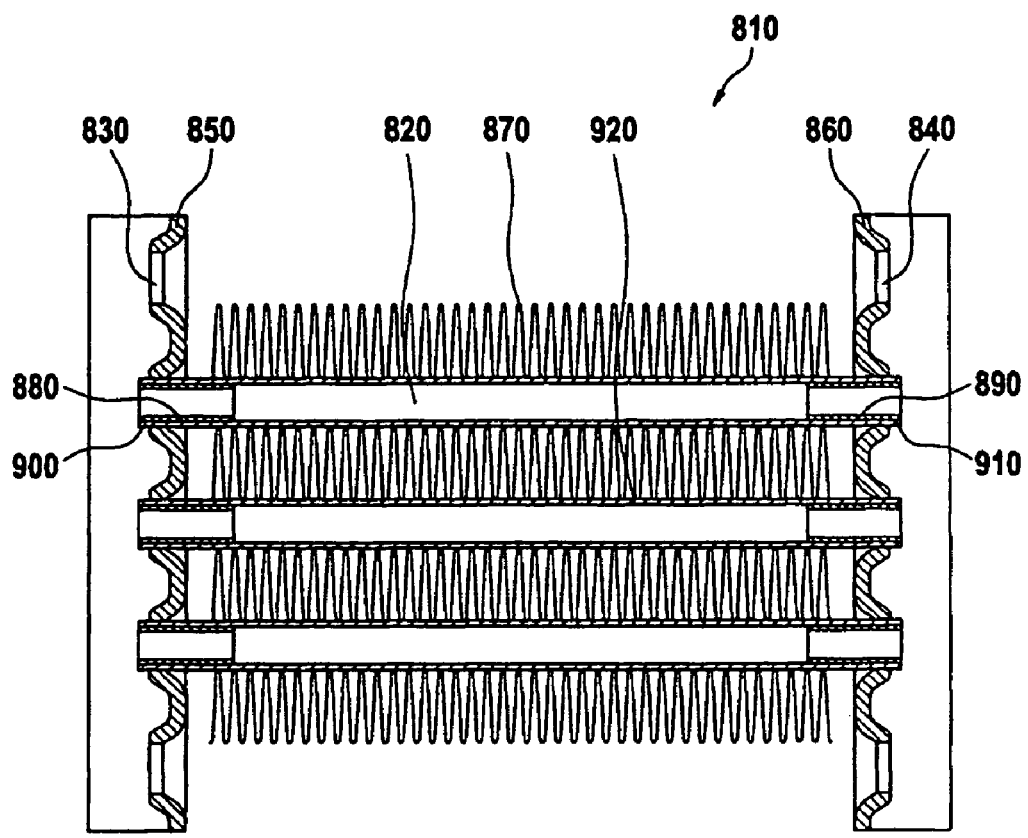
FIG. 5 shows a detail of a longitudinal section through a heat exchanger.

FIG. 5 shows a further embodiment of a heat exchanger according to the invention in longitudinal section. As in the example illustrated in FIG. 4, in the heat exchanger 810 tubes 820 are in an inserted state in orifices 830 and 840 of tube plates 850 and 860, once again corrugated ribs 870 being mounted between the tubes 820 for improved heat transmission. In the region of the tube-plate orifices 830 and 840, sleeves 880 and 890 are inserted as inner walls into the tube ends 900 and 910, with the result that the tubes 820 have a double-walled construction in the region of soldering to the tube plates 850 and 860. These tube regions, which are sensitive in terms of leaktightness and/or strength, are thereby reinforced at a low extra outlay in terms of material, since large parts 920 of the tubes 820 remain single-walled.

The present invention has been described by the example of a charge air cooler for a motor vehicle. It is pointed out, however, that the heat exchanger according to the invention is also suitable for other purposes.

The invention claimed is:

1. A heat exchanger suitable for use as a charge air cooler for a motor vehicle, comprising at least one header tank with at least one chamber for distributing and/or collecting a flowing medium; and with at least one tube bundle comprising tubes which are connected in a communicating manner to the at least one chamber, the at least one chamber having a tube plate with orifices, into which the tubes of the tube bundle are inserted, wherein at least one of said tubes has an at least double-walled construction having a first wall and a second wall in a region which is inserted in an orifice of the tube plate, wherein an inner surface of the first wall bears over at least a substantial portion of its area against an outer surface of the second wall, and wherein said inner surface and said outer surface are brazed to one another over a partial area along the substantial portion of the area in which they bear against one another.

2. The heat exchanger as claimed in claim 1, wherein inner surface of the first wall bears over essentially all of its area against the outer surface of the second wall, and wherein said inner surface and said outer surface are brazed to one another over essentially the entire portion of the area in which they bear against one another.

3. The heat exchanger as claimed in claim 2, wherein the tube plate and the first and second walls of the tube are comprised of aluminum.

4. The heat exchanger as claimed in claim 1, wherein either said first wall or said second wall comprises a shaped sheet metal strip.

5. The heat exchanger as claimed in claim 1, wherein the first or second wall of the at least one tube comprises an extruded molding.

6. The heat exchanger as claimed in claim 1, wherein the at least one tube comprises a flat tube and/or polygonal tube.

7. The heat exchanger as claimed in claim 1, wherein the at least one tube comprises at least one connecting web which connects mutually opposite regions of the inner surface of the second wall to one another.

8. The heat exchanger as claimed in claim 7, wherein the at least one connecting web is constructed in one piece with the second wall.

9. The heat exchanger as claimed in claim 1, wherein the second wall has a longitudinally extending bead that forms a depression on its outside surface.

10. The heat exchanger as claimed in claim 9, wherein the depression is of elongate design and has a depth and/or width decreases in the longitudinal direction of the depression.

11. A charge air cooler for a motor vehicle, comprising at least one header tank forming at least one chamber for distributing and/or collecting charge air for an engine of the vehicle; and at least one tube bundle comprising tubes which are connected in a communicating manner to the at least one chamber, the at least one chamber having a tube plate with orifices, into which the tubes of the tube bundle are inserted, wherein at least one of said tubes has an at least double-walled construction having a first wall and a second wall in a region which is inserted in an orifice of the tube plate, wherein an inner surface of the first wall bears over at least a substantial portion of its area against an outer surface of the second wall, and wherein said inner surface and said outer surface are brazed to one another over a partial area along the substantial portion of the area in which they bear against one another.

12. The charge air cooler as claimed in claim 11, wherein inner surface of the first wall bears over essentially all of its area against the outer surface of the second wall, and wherein said inner surface and said outer surface are brazed to one another over essentially the entire portion of the area in which they bear against one another.

13. The charge air cooler as claimed in claim 12, wherein the tube plate and the first and second walls of the tube are comprised of aluminum.

14. The charge air cooler as claimed in claim 13, wherein the at least one tube comprises a flat tube and/or polygonal tube.

15. The charge air cooler as claimed in claim 11, further comprising a second header tank forming a second chamber for distributing and/or collecting charge air for the engine of the vehicle; and wherein the least one tube bundle comprises a plurality of identical tubes which are connected in a communicating manner to the at least one and the second chambers, wherein each of said chambers has a tube plate with orifices, into which the tubes of the tube bundle are inserted, wherein a plurality of said tubes have an at least double-walled construction having a first wall and a second wall in a region at each end of the tubes which is inserted in an orifice of the respective tube plates, wherein an inner surface of the first wall bears over at least a substantial portion of its area against an outer surface of the second wall, and wherein said inner surface and said outer surface are brazed to one another over a partial area along the substantial portion of the area in which they bear against one another.

* * * * *